US012251985B2

(12) United States Patent
Kim et al.

(10) Patent No.: US 12,251,985 B2
(45) Date of Patent: Mar. 18, 2025

(54) SYSTEM AND METHOD FOR CONTROLLING INTERNAL TEMPERATURE OF VEHICLE WHEN ENGINE IS TURNED OFF

(71) Applicants: Hyundai Motor Company, Seoul (KR); Kia Corporation, Seoul (KR)

(72) Inventors: Byung-Moon Kim, Incheon (KR); Kyoung-Hee Kim, Gwangju (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 17/902,576

(22) Filed: Sep. 2, 2022

(65) Prior Publication Data

US 2023/0146968 A1 May 11, 2023

(30) Foreign Application Priority Data

Nov. 10, 2021 (KR) .......................... 10-2021-0153821

(51) Int. Cl.
*B60H 1/00* (2006.01)
*B60N 2/879* (2018.01)

(52) U.S. Cl.
CPC ..... *B60H 1/00778* (2013.01); *B60H 1/00285* (2013.01); *B60H 1/00478* (2013.01); *B60H 1/00828* (2013.01); *B60N 2/879* (2018.02)

(58) Field of Classification Search
CPC ........... B60H 1/00478; B60H 1/00778; B60H 1/00828; B60H 2001/003
See application file for complete search history.

(56) References Cited

U.S. PATENT DOCUMENTS

| | | | |
|---|---|---|---|
| 11,453,265 B1* | 9/2022 | Justice | B60H 1/00535 |
| 2006/0021366 A1* | 2/2006 | Plummer | B60H 1/323 |
| | | | 62/323.3 |
| 2006/0075766 A1* | 4/2006 | Ziehr | B60H 1/00828 |
| | | | 62/186 |
| 2011/0220729 A1* | 9/2011 | Bucknell | F02B 41/10 |
| | | | 903/902 |
| 2012/0101659 A1* | 4/2012 | Kim | B60L 1/003 |
| | | | 701/2 |
| 2018/0009349 A1* | 1/2018 | Kim | B60N 2/5657 |
| 2020/0108694 A1* | 4/2020 | Ferraris | B60H 1/241 |
| 2020/0282796 A1* | 9/2020 | Trapp | B60H 1/00792 |

FOREIGN PATENT DOCUMENTS

KR 10-2015-0142434 A 12/2015

* cited by examiner

*Primary Examiner* — Henry T Crenshaw
(74) *Attorney, Agent, or Firm* — Morgan, Lewis & Bockius LLP (57) ABSTRACT

A system for controlling an internal temperature of a vehicle when an engine is turned off includes a temperature sensor configured to measure an internal temperature (Ti) of a vehicle; a first blower configured to discharge cooled air when an electric power is supplied to the first blower; a battery; and a control unit electrically connected to the temperature sensor and the first blower and configured to receive the internal temperature (Ti) of the vehicle from the temperature sensor, and to operate the first blower, in which the control unit electrically connected to the battery is configured to control an electric power of the battery to be applied to the first blower when the internal temperature (Ti) of the vehicle is equal to or greater than a predetermined reference temperature (Tr) in a state where an engine of the vehicle is turned off.

14 Claims, 9 Drawing Sheets

SYSTEM AND METHOD FOR CONTROLLING INTERNAL TEMPERATURE OF VEHICLE WHEN ENGINE IS TURNED OFF

CROSS-REFERENCE TO RELATED APPLICATION

The present application claims priority to Korean Patent Application No. 10-2021-0153821, filed on Nov. 10, 2021, the entire contents of which is incorporated herein for all purposes by this reference.

BACKGROUND OF THE PRESENT DISCLOSURE

Field of the Present Disclosure

The present disclosure relates to a system and a method for controlling an internal temperature of a vehicle when an engine of the vehicle is turned off, which can detect an internal temperature even in a state where an engine is turned off for parking a vehicle to maintain the internal temperature at a proper temperature while suppressing an increase in the internal temperature.

Description of Related Art

A vehicle that mainly travels outdoors is exposed to solar radiation, increasing an internal temperature of the vehicle. An air conditioner provided in the vehicle is operated in a state where an engine is driven due to traveling or idling of the vehicle to reduce a temperature of the vehicle to a proper temperature.

However, because the air conditioner cannot be operated in the state where the engine is turned off, the internal temperature of the vehicle exposed to solar radiation in summer rapidly rises. If a driver parks the vehicle in a state of placing an infant or a pet in the vehicle, and then the driver leaves the vehicle for a while, there is a risk of the safety accident. When the driver leaves the vehicle in the state of maintaining the starting of the engine of the vehicle, the infant or the pet can operate a vehicle operation means such as a shift lever or a parking brake, and such operating moves the vehicle, causing the accident. To prevent such a problem, when the driver leaves the vehicle in a state where the engine of the vehicle is turned off, the infant or the pet may be exposed to a high temperature due to a rapid increase in the internal temperature, being injured.

To solve the problem, the air conditioner may be operated with the starting of the vehicle using a remote starting function of the vehicle, but this has a problem of increasing a fuel cost and causing an engine noise due to an unnecessary engine idling.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and a method for controlling an internal temperature of a vehicle when an engine of the vehicle is turned off, which sense an internal temperature of a vehicle to introduce outside air and discharges the high temperature internal air to the outside while cooling the air in the vehicle, when set to be operated in advance even in a state where an engine is turned off.

A system for controlling an internal temperature of a vehicle when an engine is turned off according to an exemplary embodiment of the present disclosure for achieving the object includes a temperature sensor configured to measure the internal temperature of the vehicle; a first blower configured to discharge cooled air when an electric power is supplied to the first blower; a battery; and a control unit electrically connected to the temperature sensor and the first blower and configured to receive a signal of the internal temperature from the temperature sensor and to operate the first blower, in which the control unit electrically connected to the battery is configured to control an electric power of the battery to be applied to the first blower when the controller concludes that the internal temperature of the vehicle is equal to or greater than a predetermined reference temperature in a state where an engine of the vehicle is turned off.

The first blower is provided with a Peltier element configured to cool and heat first and second surfaces of the Peltier element, respectively, by a Peltier effect, the air cooled by the Peltier element is supplied to an interior of the vehicle, and air heated by the Peltier element is discharged to the outside of the vehicle.

The first blower is provided on a seatback of a seat in the vehicle, a vent through which the cooled air is discharged is formed on a headrest of the seat, and the system further includes a headrest duct connecting the first blower to the vent so that the air cooled by the Peltier element is supplied to an interior of the vehicle through the vent.

The system for controlling the internal temperature of the vehicle when the engine is turned off further includes a front vent through which the air flows into the interior of the vehicle from the outside; a vent grill configured to discharge the air in the vehicle to the outside; and an exhaust duct including a rear end portion connected to the vent grill to discharge the air in the interior of the vehicle and the air heated by the Peltier element to the outside of the vehicle.

The system for controlling the internal temperature of the vehicle when the engine is turned off further includes a second blower provided on a front end portion of the exhaust duct so that the air heated by the Peltier element and the air in the vehicle are discharged through the exhaust duct.

The exhaust duct has a plurality of ducts telescopically connected each other so that a length of the exhaust duct is adjusted depending upon movement of the seat.

The system for controlling the internal temperature of the vehicle when the engine is turned off further includes a connection duct connecting the first blower to the second blower to supply the air heated by the Peltier element from the first blower to the second blower.

An operation switch configured to set whether the first blower is operated is provided on one side of the interior of the vehicle.

The control unit is configured to operate the first blower depending upon the internal temperature of the vehicle when the operation switch is set as ON.

The control unit is configured to operate the first blower depending upon the internal temperature of the vehicle when an operation request signal is input thereto by a telematics service.

Meanwhile, a method for controlling an internal temperature of a vehicle when an engine is turned off according to an exemplary embodiment of the present disclosure includes turning off an engine that turns off the engine of a vehicle and inputs a state where the engine of the vehicle is turned off to a control unit; detecting, by the control unit, an operation switch that detects whether the operation switch is set as ON; waiting for, by the control unit, an electric power that allows a battery to be in a state of supplying an electric power when the operation switch is ON; comparing, by the control unit, temperatures that compares whether the internal temperature of the vehicle measured by a temperature sensor is equal to or greater than a predetermined reference temperature so that a first blower provided in the vehicle is operated; and operating, by the control unit, a blower that operates the first blower by supplying the electric power of the battery to the first blower so that the first blower blows cooled air when the internal temperature is equal to or greater than the predetermined reference temperature.

The operating of the blower also supplies the electric power to a Peltier element so that the air is cooled by the Peltier element provided on the first blower in addition to blowing the air by operating the first blower.

The operating of the blower operates a second blower configured to discharge the air heated by the Peltier element and discharged from the first blower and the internal air of the vehicle to the outside together with the first blower.

In the comparing of the temperatures, when the internal temperature is not the reference temperature or higher, the method returns to the waiting for the electric power.

The method further includes prior to the turning off the engine, turning on an USM that turns on the user setting mode (USM) of the vehicle; determining whether the engine is turned on that determines whether the engine of the vehicle has been turned on; and determining whether a control unit is operated that determines whether the control unit is normally operated, in which when the determining of whether the engine is turned on and the determining of whether the control unit is normally operated are all satisfied, the turning off the engine is performed.

Furthermore, a method for controlling an internal temperature of a vehicle when an engine is turned off according to an exemplary embodiment of the present disclosure includes turning off an engine that turns off the engine of a vehicle and inputs a state where the engine of the vehicle is turned off to a control unit; determining, by the control unit, whether a remote control is requested that determines whether a control of the internal temperature of the vehicle is remotely requested through a telematics service; waiting for, by the control unit, an electric power that allows a battery to be in a state of supplying the electric power when the control of the internal temperature of the vehicle is requested; comparing, by the control unit, temperatures that compares whether the internal temperature of the vehicle measured by a temperature sensor is equal to or greater than a predetermined reference temperature so that a first blower provided in the vehicle is operated; and operating, by the control unit, a blower that operates the first blower by supplying the electric power of the battery to the first blower so that the first blower blows cooled air when the internal temperature is equal to or greater than the predetermined reference temperature.

The operating of the blower also supplies the electric power to a Peltier element so that the air is cooled by the Peltier element provided on the first blower in addition to blowing the air by operating the first blower.

The operating of the blower operates a second blower configured to discharge the air heated by the Peltier element and discharged from the first blower and the internal air of the vehicle to the outside together with the first blower.

In the comparing of the temperatures, when the internal temperature is not the reference temperature or higher, the method returns to the waiting for the electric power.

The method further includes prior to the turning off the engine, turning on an USM that turns on the user setting mode (USM) of the vehicle; determining whether the engine is turned on that determines whether the engine of the vehicle has been turned on; and determining whether a control unit is operated that determines whether the control unit is normally operated, in which when the determining of whether the engine is turned on and the determining of whether the control unit is normally operated are all satisfied, the turning off the engine is performed.

According to the system and method for controlling the internal temperature of the vehicle when the engine is turned off according to an exemplary embodiment of the present disclosure having the above configuration, when set to be operated in advance, it is possible to cool the air in the vehicle while introducing the outside air when the internal temperature of the vehicle rises, and discharge the predetermined temperature air to the outside, maintaining the internal temperature of the vehicle at the proper temperature.

Therefore, it is possible to prevent the infant or the pet from being exposed to the predetermined temperature (when the engine is turned off) or the safety accident caused by operating the vehicle operation means (when the engine is operated) even when the driver leaves the vehicle for a while in a state of placing the infant or the pet in the vehicle.

Furthermore, it is possible to reduce the internal temperature of the vehicle in advance in case of getting on the vehicle after parking the vehicle for a long time in the state where nobody is in the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a system and a method for controlling an internal temperature of a vehicle when an engine is turned off according to an exemplary embodiment of the present disclosure will be described in detail with reference to the accompanying drawings.

Figure 1:
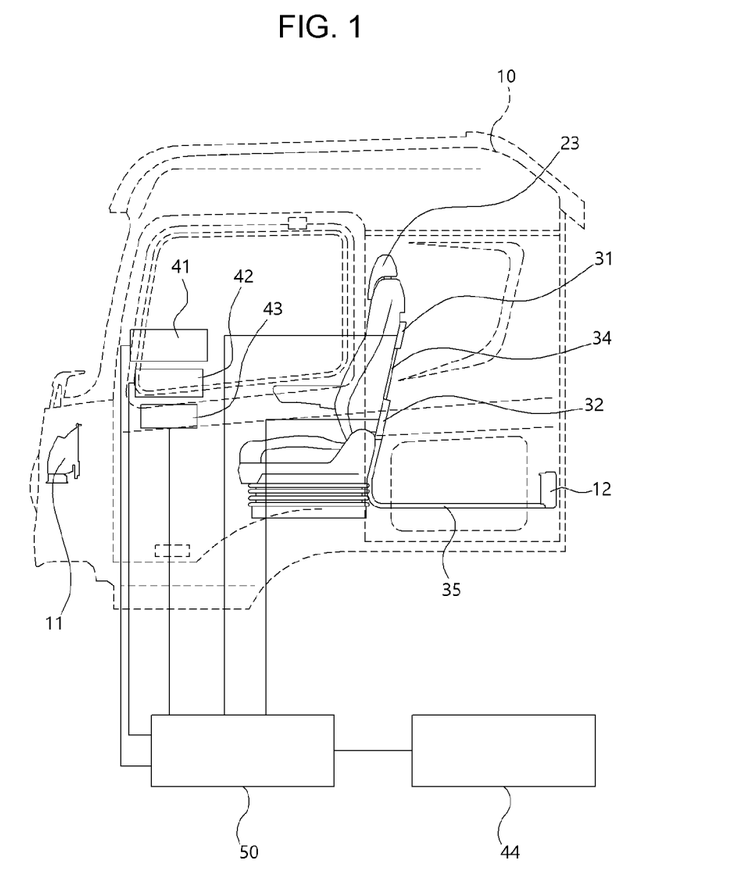
FIG. 1 is a schematic diagram showing a system for controlling an internal temperature of a vehicle when an engine is turned off according to an exemplary embodiment of the present disclosure.

A system for controlling an internal temperature of a vehicle when an engine is turned off according to an exemplary embodiment of the present disclosure includes a temperature sensor 43 configured to measure an internal temperature (Ti) of a vehicle, a first blower 31 configured to discharge cooled air when an electric power is supplied, a battery 44, and a control unit 50 configured to receive the internal temperature (Ti) of the vehicle from the temperature sensor 43, and to operate the first blower 31, in which the control unit 50 controls an electric power of the battery 44 to be applied to the first blower 31 when the internal temperature (Ti) of the vehicle is equal to or greater than a predetermined reference temperature (Tr) in a state where the engine of the vehicle is turned off.

According to an exemplary embodiment of the present disclosure, the cooled air is supplied into the interior of the vehicle when the internal temperature (Ti) of the vehicle is equal to or greater than the predetermined reference temperature (Tr) by measuring the internal temperature (Ti) of the interior of the vehicle parked after the engine is turned off, so that the interior of the vehicle may be maintained at a proper temperature.

Figure 2:
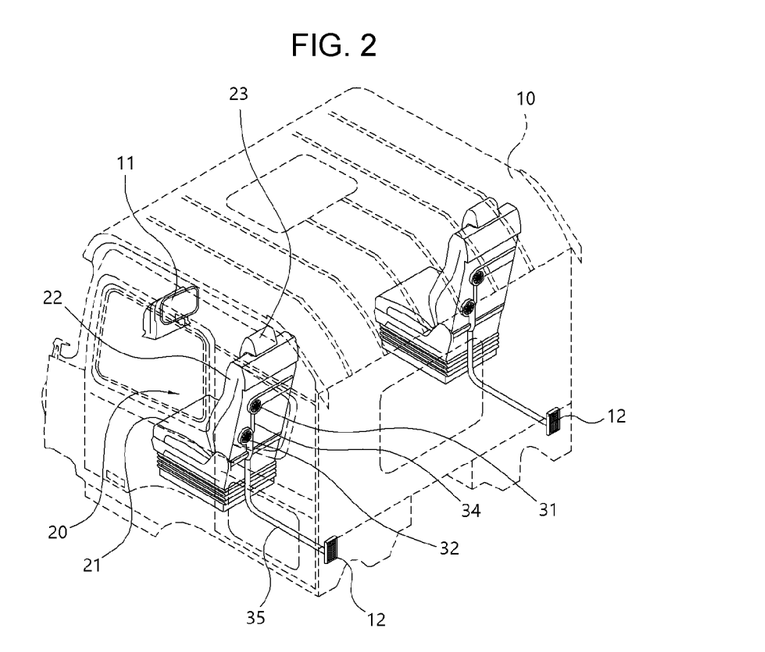
FIG. 2 is a rear perspective diagram showing a cap of the vehicle mounted with the system for controlling the internal temperature of the vehicle when the engine is turned off according to an exemplary embodiment of the present disclosure.

According to the exemplary embodiment of the present disclosure, an example of the vehicle may be a truck. Therefore, an example in which an internal temperature of a cap 10 of the truck is controlled in the truck which is parked in a state where an engine is turned off will be described.

The cap 10 is formed with a front vent 11 allowing outside air to flow into the inside of the cap 10, that is, the interior of the vehicle and a vent grill 2 configured to discharge the air in the vehicle to the outside of the vehicle. When the vehicle is exposed to solar radiation, the temperature in the cap 10 is higher than that of the outside air, so that the outside air flows into the cap 10 through the front vent 11. Furthermore, the air heated by the high temperature air in the cap 10 and a Peltier element 31a to be described later is discharged to the outside through the vent grill 12.

A seat 20 includes a seat cushion 21 configured to support a passenger's hips, a seatback 22 configured to support the passenger's back, and a headrest 23 configured to support the passenger's head. The seat cushion 21 is provided to be slidable in the cap 10, and the seatback 22 is provided so that its angle is adjusted with respect to the seat cushion 21.

According to an exemplary embodiment of the present disclosure, the first blower 31 configured to supply the cooled air into the cap 10 and the second blower 32 configured to discharge the air in the cap 10 to the outside are provided on a rear surface of the seatback 22.

Figure 4A:
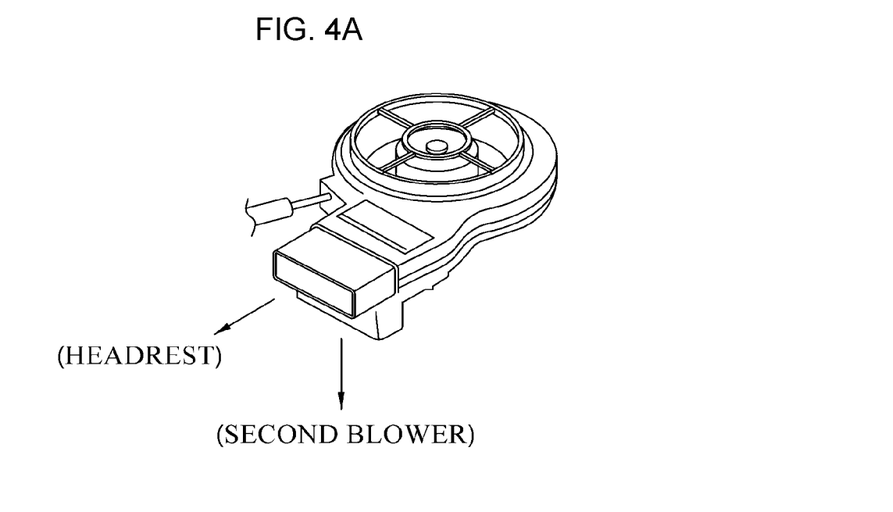
FIG. 4A and FIG. 4B are schematic diagrams showing an operation structure of a first blower in system for controlling the internal temperature of the vehicle when the engine is turned off according to an exemplary embodiment of the present disclosure.
Figure 4B:
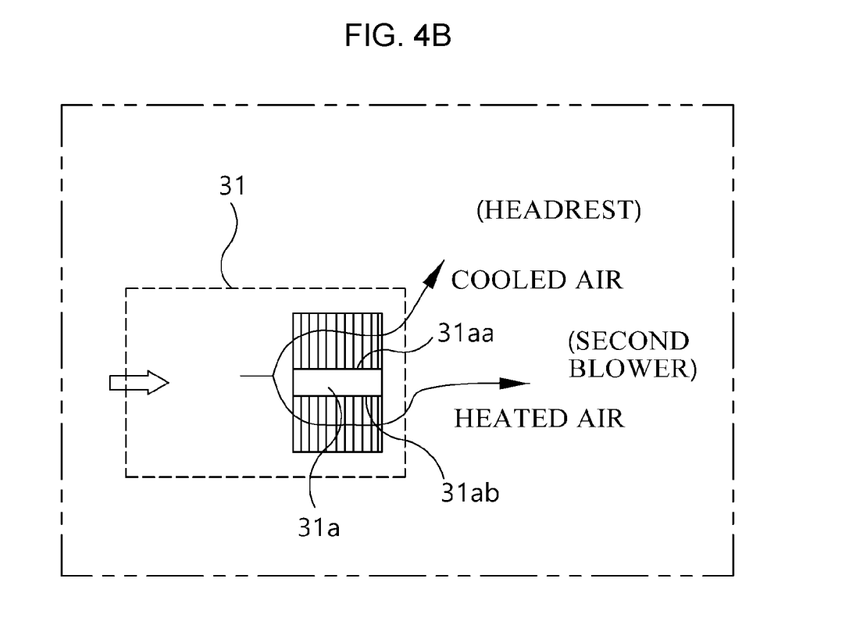

When the electric power is applied, the first blower 31 is configured to blow the air like a general blower. According to an exemplary embodiment of the present disclosure, to supply the cooled air into the cap 10, an element to cool the air is provided in the first blower 31. FIG. 4A and FIG. 4B show examples in which the Peltier element 31a is provided in the first blower 31. Because the Peltier element 31a is integrally provided in the first blower 31, the electric power is also supplied to the Peltier element 31a for blowing when the electric power is supplied to the first blower 31 for blowing. The Peltier element 31a is an element that has one side surface heated by a Peltier effect and the other side surface cooled when the electric power is applied thereto. While being blown to both side surfaces of the Peltier element 31a, the air passing through a cooling surface 31a of the Peltier element 31a is supplied into the cap 10, and the air passing through a heating surface 31ab of the Peltier element 31a is discharged to the outside of the cap 10, so that the interior of the vehicle maintains a proper temperature.

The second blower 32 discharges the internal air of the vehicle and the air passing through the heating surface 31ab of the Peltier element 31a to the outside of the vehicle. The second blower 32 is formed to have a structure of a general blower to discharge the air in the cap 10 highly heated by solar radiation and the air heated by passing through the heating surface 31ab to the outside of the cap 10 together.

Figure 5:
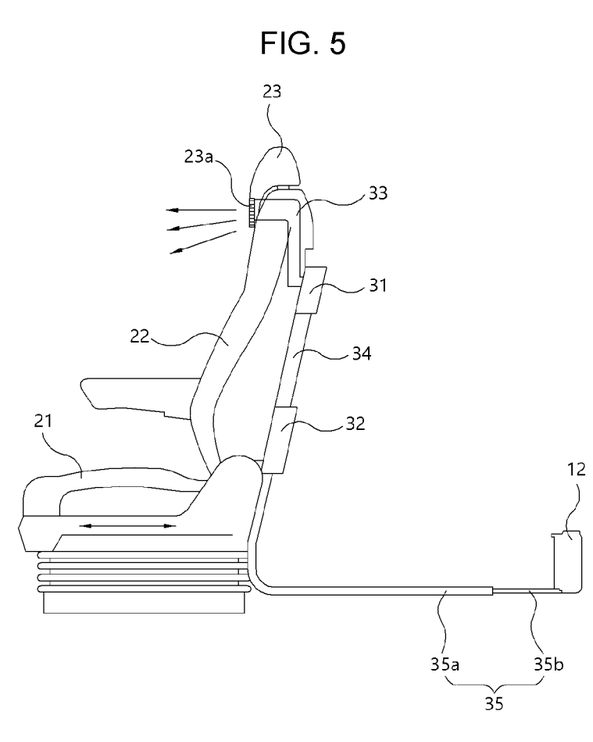
FIG. 5 is a schematic diagram showing a side surface of a seat in the system for controlling the internal temperature of the vehicle when the engine is turned off according to an exemplary embodiment of the present disclosure.

Meanwhile, as shown in FIG. 5, a duct is provided the air discharged from the first blower 31 and the second blower 32 to flows in an intended direction.

A headrest duct 33 is formed to connect the first blower 31 to a vent 23a formed on the headrest 23. The headrest duct 33 allows the air passing through the cooling surface 31a to be supplied from the first blower 31 to the vent 23a, so that the air cooled in the vent 23a may be blown into the cap 10.

A connection duct 34 connects the first blower 31 to the second blower 32. The connection duct 34 is a passage through which the air passing through the heating surface 31ab flows to the second blower 32 without distributing the air.

An exhaust duct 35 is provided to connect the second blower 32 to the vent grill 12. Because the second blower 32 is provided on a front end portion of the exhaust duct 35, the second blower 32 discharges the air heated by the heating surface 31ab and the air in the cap 10 to the exhaust duct 35 together.

Figure 6:
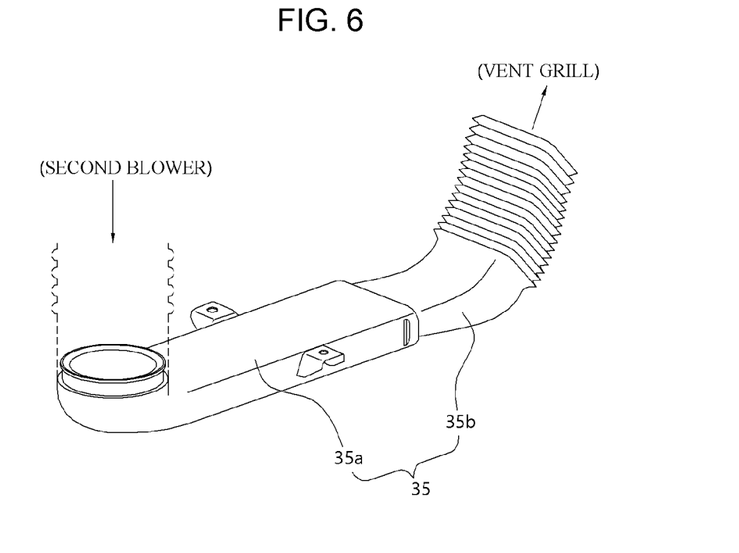
FIG. 6 is a perspective diagram showing an exhaust duct in the system controlling the internal temperature of the vehicle when the engine is turned off according to an exemplary embodiment of the present disclosure.
Figure 7A:
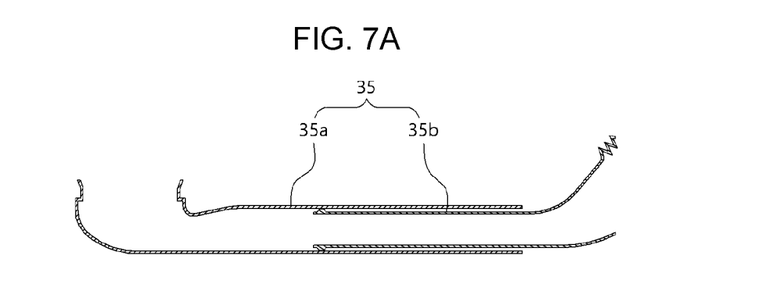
FIG. 7A and FIG. 7B are cross-sectional diagrams showing a state where a length of the exhaust duct is adjusted in the system for controlling the internal temperature of the vehicle when the engine is turned off according to an exemplary embodiment of the present disclosure.
Figure 7B:
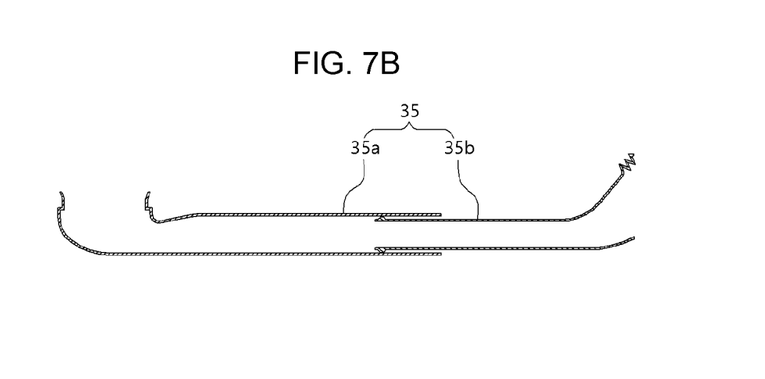

The exhaust duct 35 has a structure in which a length thereof is changed to correspond to the adjustment of a location of the seat 20. For example, as shown in FIGS. 6 to 7B, a plurality of ducts 35a, 35b are configured to be connected in a telescopic manner, so that the seat 20 is reduced in length when moving backward and the seat 20 is increased in length when moving forward thereof. FIGS. 6 to 7B show an example in which the exhaust duct 35 includes a front duct 35a and a rear duct 35b. As described above, the length of the exhaust duct 35 is changed, so that the air heated by solar radiation or the heating surface 31ab is discharged to the outside through the exhaust duct 35 and the vent grill 12 without being circulated into the cap 10. Therefore, the internal temperature of the cap 10 is rapidly reduced by the air passing through the cooling surface 31aa.

A control panel 41 can allow the passenger to set whether the system according to an exemplary embodiment of the present disclosure is used. A cluster, a navigation, an Audio, Video, and Navigation (AVN), etc. of the vehicle may be the control panel 41. The control panel 42, may be set, whether various devices of the vehicle including an air conditioner are used, the predetermined settings, etc., by the user setting mode (USM). The passenger sets whether to use the system according to an exemplary embodiment of the present disclosure through the control panel 41.

An operation switch 42 sets whether the first blower 31 and the second blower 32 are operated when the driver leaves the vehicle after the vehicle is parked and the engine is turned off. The operation switch 42 is provided on one side of the cap 10, and can also select blowing amounts of the first blower 31 and the second blower 32.

A temperature sensor 43 is provided on one side of the cap 10 to measure the temperature in the cap 10, that is, the internal temperature (Ti) of the vehicle.

A battery 44 supplies an electric power required for operating the first blower 31 and the second blower 32. The battery 44 is configured to supply the electric power required for electric parts of the vehicle in a state where the engine is turned on or the key is ON, and according to an exemplary embodiment of the present disclosure, also supplies the electric power required for operating the first blower 31 and the second blower 32 even in the state where the engine is turned off.

The control unit 50 receives signals from the control panel 41, the operation switch 42, and the temperature sensor 43, and determines whether the first blower 31 and the second blower 32 are operated. Furthermore, the control unit 50 controls the electric power to be supplied to the first blower 31 and the second blower 32 from the battery 44 if the operations of the first blower 31 and the second blower 32 are required. The control unit 50 is also connected to a telematics system and therefore, can control the first blower 31 and the second blower 32 to be operated when the operations thereof are remotely requested.

The control unit 50 stores, as a logic, a method for controlling the internal temperature of the vehicle when the engine is turned off to be described later, and therefore, performs the method for controlling the internal temperature of the vehicle when the engine is turned off.

Furthermore, because the control unit 50 should be operated even in the state where the engine of the vehicle is turned off, the electric power is always supplied to the control unit 50, regardless of engine turning on.

Figure 8:
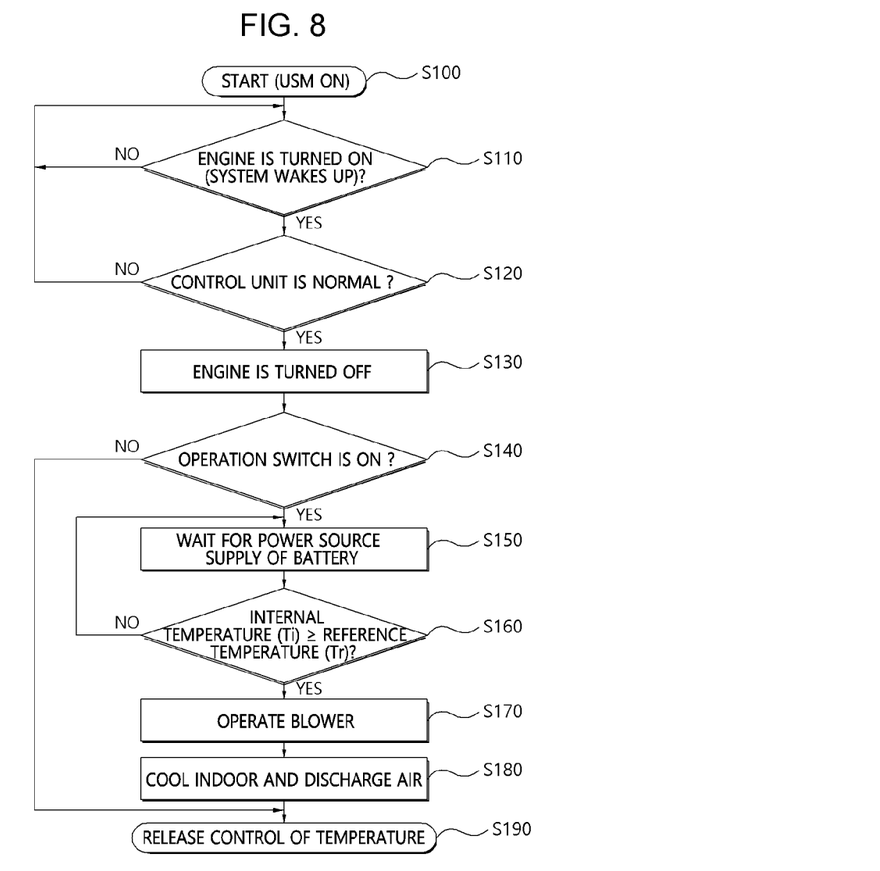
FIG. 8 is a flowchart showing a method for controlling the internal temperature of the vehicle when the engine is turned off according to an exemplary embodiment of the present disclosure.

Meanwhile, FIG. 8 shows an exemplary embodiment of the method for controlling the internal temperature of the vehicle when the engine is turned off according to an exemplary embodiment of the present disclosure.

The method for controlling the internal temperature of the vehicle when the engine is turned off according to an exemplary embodiment of the present disclosure is performed by the system for controlling the internal temperature of the vehicle when the engine is turned off as described above.

Turning on an USM (S100) turns on the user setting mode (USM) of the vehicle. When the key is in an ON state (state where the key operation of the vehicle is located at ON through the ACC) by the driver of the vehicle, the electric power is supplied to the vehicle.

Determining whether an engine is turned on (S110) determines whether the engine of the vehicle has been turned on. Because the control devices may be activated and operated when the engine is turned on (state where the vehicle's key is located at ON and the engine is turned on), the system for controlling the internal temperature of the vehicle when the engine is turned off may be used, later. Therefore, the determining of whether the engine is turned on (S110) determines whether the engine is turned on.

Determining whether the control unit is operated (S120) determines whether the control unit 50 is normally operated. When the control unit 50 is not normally operated, each of the subsequent steps cannot be normally performed, and therefore, the determining whether the control unit is operated (S120) determines whether the control unit 50 is normally operated.

The turning on of the USM (S100) to the determining of whether the control unit is operated (S120) determines whether the vehicle and the system for controlling the internal temperature of the vehicle when the engine is turned off according to an exemplary embodiment of the present disclosure are operated normally so that the method for controlling the internal temperature of the vehicle when the engine is turned off is performed.

When the determining of whether the engine is turned on (S110) and the determining of whether the control unit is operated (S120) are all satisfied, each of the subsequent steps is performed, and when any one thereof is not satisfied, the method returns to the step prior to the determining of whether the engine is turned on (S110).

Turning off the engine (S130) turns off the engine of the vehicle. For the driver to park and then leave the vehicle, the engine of the vehicle is turned off. When the engine is turned off, the state where the engine is turned off may be input from an engine management system (EMS), etc. to the control unit 50.

Meanwhile, the turning on of the USM (S100) to the determining of whether the control unit is operated (S120) are performed prior to the state where the engine is turned off, that is, the state where the engine is turned on, and therefore, the performed result is stored in the control unit 50.

Detecting an operation switch (S140) detects whether the operation switch 42 is set as ON. The control unit 50 detects a state of the operation switch 42 to perform each step to be described later. If the operation switch 42 is set as ON, the first blower 31 and the second blower 32 are operated when the internal temperature (Ti) is high.

Otherwise, when the operation switch 42 is set as OFF, the driver does not want to operate the first blower 31 and the second blower 32 even if the internal temperature (Ti) rises in the state where the vehicle is parked and then the engine is turned off, and therefore, each step after the detecting of the operation switch (S140) is not performed, and releasing a control of the temperature (S190) is immediately performed to finish the logic.

Waiting for an electric power (S150) allows the battery 44 to be in a state where the electric power may be supplied when the operation switch 42 is set as ON. When the state of the operation switch 42 is detected as ON, the control unit 50 controls the battery 44 to be in a state of being able to supply the electric power so that the first blower 31 and the second blower 32 are immediately operated depending upon the internal temperature (Ti).

Comparing temperatures (S160) compares whether the internal temperature (Ti) of the interior of the vehicle is equal to or greater than a reference temperature (Tr) which is set so that the first blower 31 is operated. The control unit 50 compares the internal temperature (Ti) measured by the temperature sensor 43 with the reference temperature (Tr) set to operate the first blower 31 to determine whether the first blower 31 and the second blower 32 are operated.

Operating a blower (S170) operates the first blower 31 by supplying the electric power of the battery 44 to the first blower 31 when the internal temperature (Ti) is equal to or greater than the reference temperature (Tr). When the internal temperature (Ti) is equal to or greater than the reference temperature (Tr), the control unit 50 operates the first blower 31 by supplying the electric power of the battery 44 to the first blower 31. When the first blower 31 is operated, the electric power is also supplied to the Peltier element 31a provided on the first blower 31 in addition to being blown through the first blower 31, so that a part of the air discharged from the first blower 31 is cooled and the rest is heated.

Meanwhile, in the operating of the blower (S170), when the control unit 50 operates the first blower 31, the electric power is also applied to the second blower 32 so that the second blower 32 is also operated together.

Figure 3A:
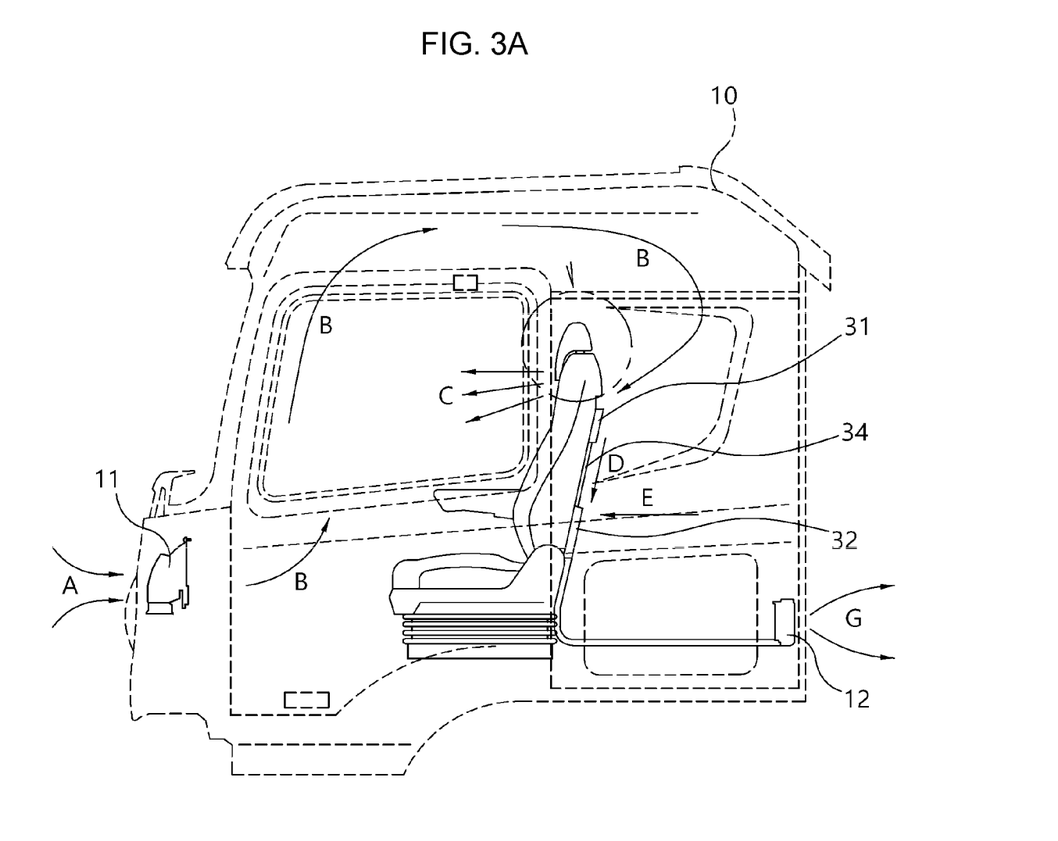
FIG. 3A and FIG. 3B are schematic diagrams showing the airflow by the system for controlling the internal temperature of the vehicle when the engine is turned off according to an exemplary embodiment of the present disclosure.
Figure 3B:
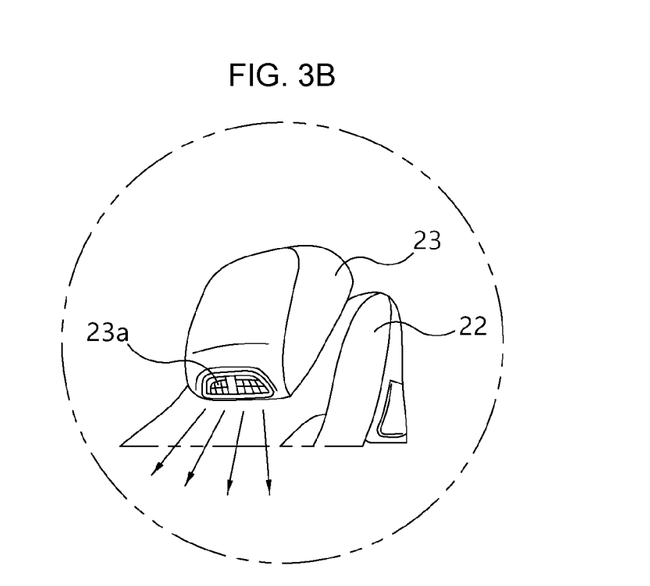

When the first blower 31 and the second blower 32 are operated, cooling the indoor and discharging air (S180) is performed. When the first blower 31 and the second blower 32 are operated, as shown in FIGS. 3A and 3B, the air flows into the cap 10 to reduce the temperature in the cap 10, that is, the internal temperature (Ti) of the vehicle. The outside air flows in the cap 10 when flowing into the cap 10 through the front vent 11. Thereafter, the outside air flows into the first blower 31, and a part thereof coming from the first blower 31 is discharged toward the headrest 23 (C) and the rest is discharged to the connection duct 34 (D). The air discharged to the headrest 23 is supplied into the cap 10 through the vent 23a formed on the headrest 23, and this is the air cooled by the Peltier element 31a, reducing the internal temperature (Ti). Meanwhile, the air discharged from the first blower 31 to the connection duct 34 flows into the second blower 32.

Furthermore, the air in the cap 10 also flows into the second blower 32 (E). The air flowing into the second blower 32 is the air heated by solar radiation or heated by the Peltier element 31a, and exhausted from the second blower 32 to the exhaust duct 35 (F). Thereafter, the high-temperature air is discharged to the outside through the vent grill 12 (G).

As described above, when the first blower 31 and the second blower 32 are operated, the internal temperature (Ti) of the vehicle is reduced by the air passing through the cooling surface 31a of the Peltier element 31a as the outside air is introduced from the outside of the vehicle. Furthermore, the high-temperature internal air and the air passing through the heating surface 31ab of the Peltier element 31a are not distributed, not mixed with the internal air through the connection duct 34 and the exhaust duct 35, and discharged to the outside, efficiently reducing the internal temperature of the vehicle.

Thereafter, the releasing of the control of the temperature (S190) that interrupts the operations of the first blower 31 and the second blower 32 is performed.

Meanwhile, after the cooling the indoor and discharging the air (S180), the releasing of the control of the temperature (S190) may be performed, but the first blower 31 and the second blower 32 may be continuously operated until the internal temperature (Ti) is equal to or greater than the reference temperature (Tr) by returning to the comparing of the temperatures (S160).

Figure 9:
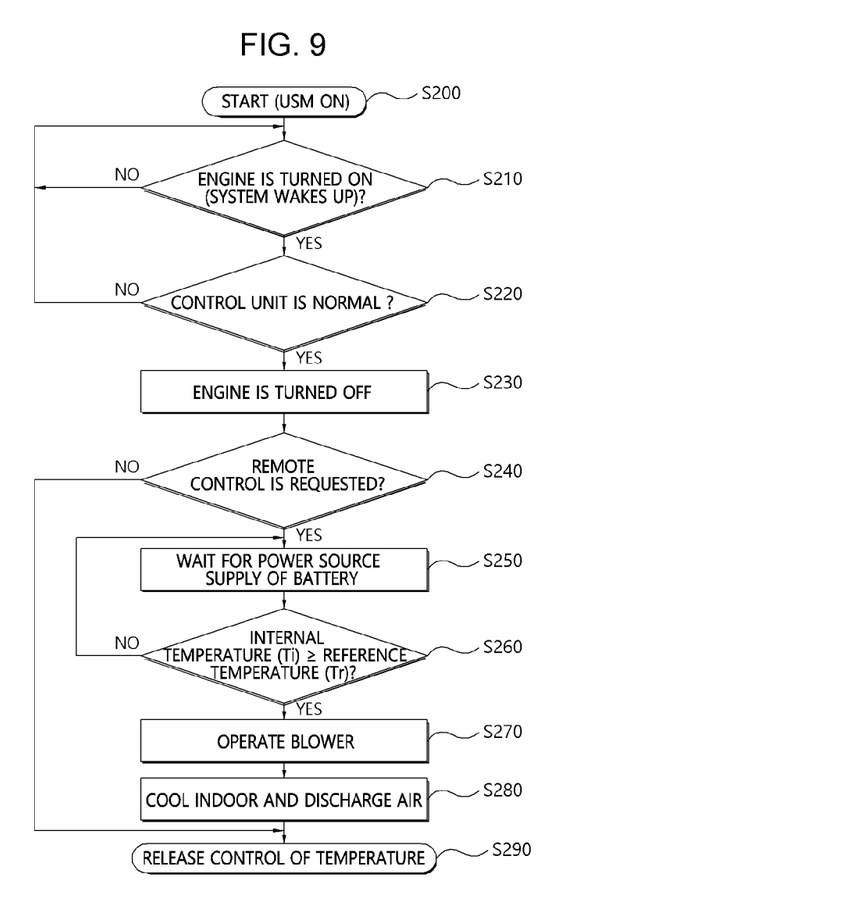
FIG. 9 is a flowchart showing a method for controlling an internal temperature of a vehicle when an engine is turned off according to another exemplary embodiment of the present disclosure.

A method for controlling the internal temperature of the vehicle when the engine is turned off according to another exemplary embodiment of the present disclosure will be described as follows with reference to FIG. 9.

The method for controlling the internal temperature of the vehicle when the engine is turned off according to the exemplary embodiment of the present disclosure is also performed by the system for controlling the internal temperature of the vehicle when the engine is turned off as described above.

Furthermore, the method for controlling the internal temperature of the vehicle when the engine is turned off according to the exemplary embodiment of the present disclosure is similar to the method for controlling the internal temperature of the vehicle when the engine is turned off according to the aforementioned exemplary embodiment of the present disclosure, and the driver does not set in advance whether to operate the system using the operation switch 42 before leaving the vehicle, but remotely asks the operation.

Turning on the USM (S200), determining whether the engine is turned on (S210), determining whether the control unit is operated (S220), and turning off the engine (S230) according to the exemplary embodiment of the present disclosure are the same as the turning on of the USM (S100) to the turning off the engine (S130) according to the aforementioned exemplary embodiment of the present disclosure.

Determining whether a remote control is requested (S240) performed later determines whether the control of the internal temperature (Ti) of the vehicle has been remotely requested through a telematics service. Because the control unit 50 is connected to the telematics system, the control unit 50 determines whether the operations of the first blower 31 and the second blower 32 have been requested at a remote location by the driver who is away therefrom using a terminal such as a smart phone.

When the driver requests the operations of the first blower 31 and the second blower 32 at the remote location, waiting for an electric power (S250) is performed.

If the driver does not request the operations of the first blower 31 and the second blower 32, releasing a control of the temperature (S290) is immediately performed to finish a logic. Alternatively, even if the driver does not request the operations of the first blower 31 and the second blower 32, there may be the request after that, and therefore, the determining of whether the remote control is requested (S240) can also be repetitively performed.

In the determining of whether the remote control is requested (S240), when the driver requests the operations of the first blower 31 and the second blower 32, the waiting for the electric power (S250), comparing temperatures (S260), operating a blower (S270), and cooling the indoor and discharging air (S280) are performed. Because the waiting for the electric power (S250) to the cooling the indoor and discharging the air (S280) according to the exemplary embodiment of the present disclosure are the same as the waiting for the electric power (S150) to the cooling the indoor and discharging the air (S180) according to the aforementioned exemplary embodiment of the present disclosure, a detailed description thereof will be omitted.

After the cooling the indoor and discharging the air (S280), the releasing of the control of the temperature (S290) that interrupts the operations of the first blower 31 and the second blower 32 is performed.

Meanwhile, by also returning to the cooling the indoor and discharging the air (S280) in the exemplary embodiment of the present disclosure, the first blower 31 and the second blower 32 may be continuously operated when the internal temperature (Ti) is equal to or greater than the reference temperature (Tr).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for controlling an internal temperature of a vehicle when an engine of the vehicle is turned off, the system comprising:
   a temperature sensor configured to measure the internal temperature of the vehicle;
   a first blower configured to discharge cooled air when an electric power is supplied to the first blower;
   a battery; and
   a control unit electrically connected to the temperature sensor and the first blower and configured to receive a signal of the internal temperature from the temperature sensor and to operate the first blower,
   wherein the control unit electrically connected to the battery is configured to control an electric power of the battery to be applied to the first blower when the controller concludes that the internal temperature of the vehicle is equal to or greater than a predetermined reference temperature in a state where the engine of the vehicle is turned off, wherein the first blower is provided with a Peltier element configured to cool and heat first and second surfaces of the Peltier element, respectively, by a Peltier effect, wherein the air cooled by the Peltier element is supplied to an interior of the vehicle, wherein air heated by the Peltier element is discharged to an outside of the vehicle, and wherein the system further includes:
 a front vent through which air flows into the interior of the vehicle from the outside;
 a vent grill configured to discharge the air in the vehicle to the outside; and
 an exhaust duct including a rear end portion connected to the vent grill to discharge the air in the interior of the vehicle and the air heated by the Peltier element to the outside of the vehicle.

2. The system of claim 1, further including a headrest duct,
wherein the first blower is provided on a seatback of a seat in the vehicle,
wherein a vent through which the cooled air is discharged is formed on a headrest of the seat, and
wherein the headrest duct connects the first blower to the vent so that the air cooled by the Peltier element is supplied to the interior of the vehicle through the vent.

3. The system of claim 1, further including:
a second blower provided on a front end portion of the exhaust duct so that the air heated by the Peltier element and the air in the vehicle are discharged through the exhaust duct.

4. The system of claim 1,
wherein the exhaust duct has a plurality of ducts telescopically connected each other so that a length of the exhaust duct is adjusted depending upon movement of a seat.

5. The system of claim 3, further including:
a connection duct connecting the first blower to the second blower to supply the air heated by the Peltier element from the first blower to the second blower.

6. The system of claim 1, further including an operation switch,
wherein the operation switch configured to set whether the first blower is operated is provided on one side of an interior of the vehicle.

7. The system of claim 6,
wherein the control unit is configured to operate the first blower depending upon the internal temperature of the vehicle when the operation switch is set as ON.

8. The system of claim 1,
wherein the control unit is configured to operate the first blower depending upon the internal temperature of the vehicle when an operation request signal is input thereto by a telematics service.

9. A method for controlling an internal temperature of a vehicle when an engine of the vehicle is turned off, the method comprising:
 receiving, by a control unit, information related to a state where the engine of the vehicle is turned OFF;
 detecting, by the control unit, whether an operation switch is set as ON;
 waiting for, by the control unit, an electric power that allows a battery to be in a state of supplying the electric power when the operation switch is ON;
 determining, by the control unit, whether the internal temperature of the vehicle measured by a temperature sensor is equal to or greater than a predetermined reference temperature so that a first blower provided in the vehicle is operated; and
 operating, by the control unit, the first blower by supplying the electric power of the battery to the first blower so that the first blower blows cooled air when the internal temperature is equal to or greater than the predetermined reference temperature,
wherein in the operating of the first blower, the control unit is configured to supply the electric power to a Peltier element so that air is cooled by the Peltier element provided on the first blower in addition to blowing the air by operating the first blower, and
wherein the control unit is further configured to operate a second blower configured to discharge the air heated by the Peltier element and discharged from the first blower and an internal air of the vehicle to an outside together with the first blower.

10. The method of claim 9,
wherein in the determining, when the internal temperature is lower than the predetermined reference temperature, the method returns to the waiting for the electric power.

11. The method of claim 9, further including:
prior to the turning off the engine,
turning on an user setting mode (USM) of the vehicle;
determining whether the engine of the vehicle has been turned on; and
determining whether the control unit is normally operated,
wherein when the determining of whether the engine is turned on and the determining of whether the control unit is normally operated are all satisfied, the turning off the engine is performed.

12. A method for controlling an internal temperature of a vehicle when an engine of the vehicle is turned off, the method comprising:
 receiving, by a control unit, information related to a state where the engine of the vehicle is turned OFF;
 determining, by the control unit, whether a control of the internal temperature of the vehicle is remotely requested through a telematics service;
 waiting for, by the control unit, an electric power that allows a battery to be in a state of supplying the electric power when the control of the internal temperature of the vehicle is requested;
 determining, by the control unit, whether the internal temperature of the vehicle measured by a temperature sensor is equal to or greater than a predetermined reference temperature so that a first blower provided in the vehicle is operated; and
 operating, by the control unit, the first blower by supplying the electric power of the battery to the first blower so that the first blower blows cooled air when the internal temperature is equal to or greater than the predetermined reference temperature,
wherein in the operating of the first blower, the control unit is configured to supply the electric power to a Peltier element so that the air is cooled by the Peltier element provided on the first blower in addition to blowing the air by operating the first blower, and
wherein in the operating of the first blower, the control unit is configured to operate a second blower configured to discharge the air heated by the Peltier element and discharged from the first blower and an internal air of the vehicle to an outside together with the first blower.

13. The method of claim 12,
wherein in the determining whether the internal temperature of the vehicle measured by a temperature sensor is equal to or greater than the predetermined reference temperature, when the internal temperature is lower than the predetermined reference temperature, the method returns to the waiting for the electric power.

14. The method of claim 12, further including:
prior to the turning off the engine,
turning on an user setting mode (USM) of the vehicle;
determining whether the engine of the vehicle has been turned on; and
determining whether the control unit is normally operated,
wherein when the determining of whether the engine is turned on and the determining of whether the control unit is normally operated are all satisfied, the turning off the engine is performed.

\* \* \* \* \*